US009055490B2

(12) United States Patent
Fukuda

(10) Patent No.: US 9,055,490 B2
(45) Date of Patent: Jun. 9, 2015

(54) RADIO COMMUNICATION SYSTEM, BASE STATION APPARATUS AND HANDOVER CONTROL METHOD USED THEREFOR, AND STORAGE MEDIUM HAVING PROGRAM OF HANDOVER CONTROL STORED THEREON

(75) Inventor: Yohsuke Fukuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/114,505

(22) PCT Filed: May 9, 2012

(86) PCT No.: PCT/JP2012/003031
§ 371 (c)(1),
(2), (4) Date: Oct. 28, 2013

(87) PCT Pub. No.: WO2012/153525
PCT Pub. Date: Nov. 15, 2012

(65) Prior Publication Data
US 2014/0045503 A1 Feb. 13, 2014

(30) Foreign Application Priority Data

May 11, 2011 (JP) ................. 2011-105764

(51) Int. Cl.
*H04W 36/00* (2009.01)
*H04W 36/08* (2009.01)
*H04W 48/08* (2009.01)
*H04W 88/08* (2009.01)

(52) U.S. Cl.
CPC .......... *H04W 36/0061* (2013.01); *H04W 36/08* (2013.01); *H04W 48/08* (2013.01); *H04W 88/08* (2013.01)

(58) Field of Classification Search
None
See application file for complete search history.

(56) References Cited

U.S. PATENT DOCUMENTS

| 8,121,087 | B2 | 2/2012 | Ryu et al. |
| 2008/0311904 | A1* | 12/2008 | Courseille ............... 455/427 |
| 2008/0311914 | A1 | 12/2008 | Tinnakornsrisuphap et al. |
| 2009/0052428 | A1 | 2/2009 | Ryu et al. |
| 2010/0167744 | A1* | 7/2010 | Grob-Lipski et al. ........ 455/436 |

FOREIGN PATENT DOCUMENTS

| JP | 2007-536873 A | 12/2007 |
| JP | 2010-21890 A | 1/2010 |
| JP | 2010-193278 A | 9/2010 |
| JP | 2010-530723 A | 9/2010 |

OTHER PUBLICATIONS

International Search Report (ISR) (PCT Form PCT/ISA/210), in PCT/JP2012/003031, dated Jul. 24, 2012.

* cited by examiner

*Primary Examiner* — Erika A Washington
(74) *Attorney, Agent, or Firm* — McGinn IP Law Group, PLLC

(57) ABSTRACT

A radio communication system, in a base station apparatus, previously registers neighboring base station information as a part of base station management information, and informs the terminal station of the neighboring base station information. The base station apparatus includes a handover processing unit for detecting that the terminal station has implemented handover that does not pass through a handover preparation phase from an other base station that has not been registered in a list of the neighboring base station information; and a management unit for dynamically additionally registering the other base station in the list of the neighboring base station information when implementation of the handover has been detected by the handover processing unit.

19 Claims, 4 Drawing Sheets

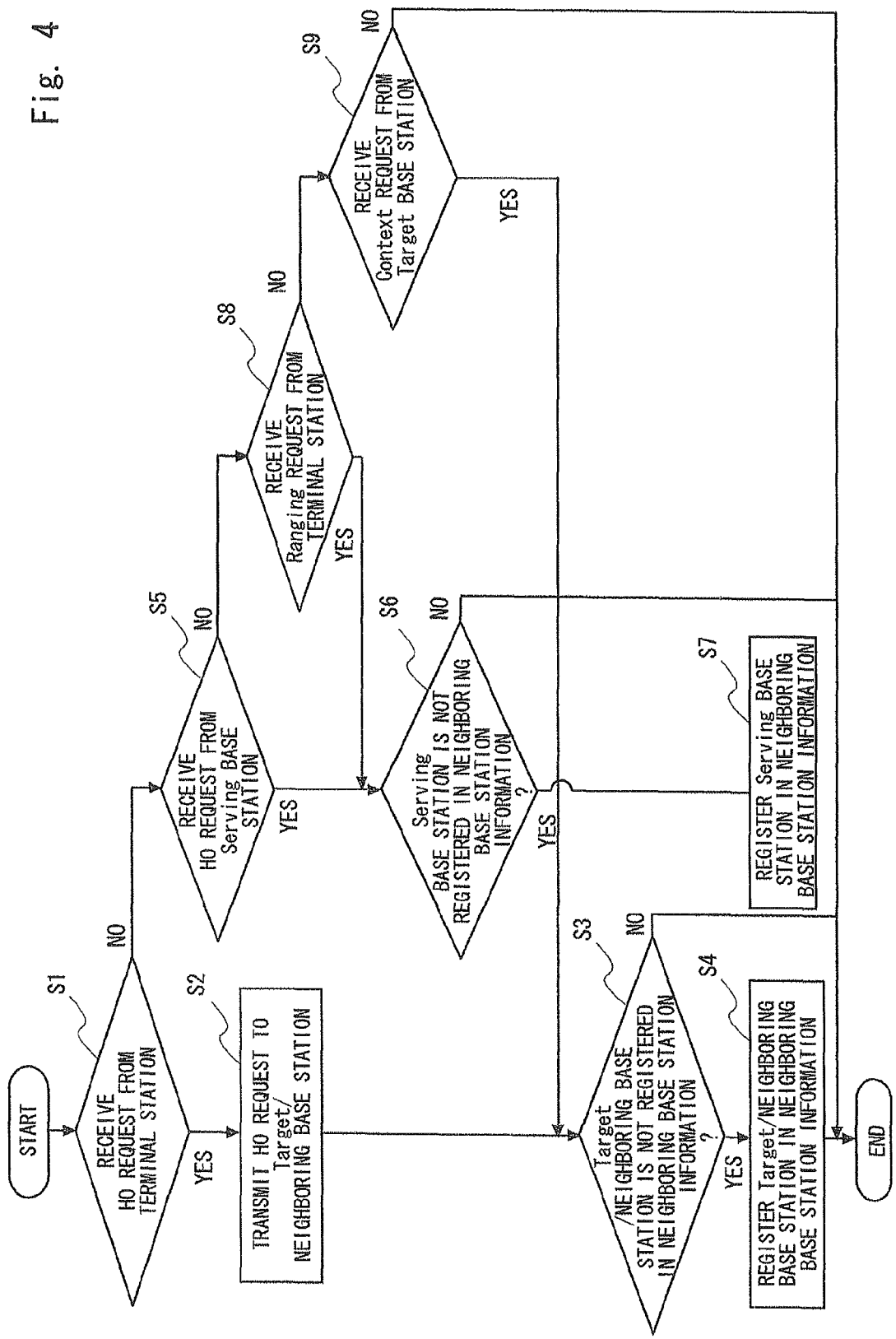

RADIO COMMUNICATION SYSTEM, BASE STATION APPARATUS AND HANDOVER CONTROL METHOD USED THEREFOR, AND STORAGE MEDIUM HAVING PROGRAM OF HANDOVER CONTROL STORED THEREON

TECHNICAL FIELD

The present invention relates to a radio communication system, a base station apparatus and a handover control method used therefor, and a storage medium having a program of handover control stored thereon and, in particular, to neighboring base station information management in a radio base station.

BACKGROUND ART

In neighboring base station information management in a radio base station relevant to the present invention, a physically close base station is selected from surrounding area information (base station map information), and it is statically or dynamically registered in neighboring base station information. Higher speed in handover has been examined by using this neighboring base station information.

Nevertheless, as in an urban area, in an environment where a propagation environment is complicatedly changed due to density of buildings or other shields, handover between base stations may occur that cannot be assumed from physical base station arrangement and prior numerical simulation.

As the above-described neighboring base station information management, there has been proposed a method of exchanging adjacent base station information regarding base stations in which handover has actually been generated (for example, refer to Patent literature 1). In addition, as neighboring base station information, examples include peripheral base station information acquired through scanning and a synchronization process to a peripheral base station (for example, refer to Patent literature 2).

CITATION LIST

Patent Literature

Patent literature 1: Japanese Unexamined Patent Application Publication No. 2010-193278

Published Japanese Translation of PCT International Publication for Patent Application, No. 2007-536873

SUMMARY OF INVENTION

Technical Problem

However, in a radio base station relevant to the present invention, when the unpredictable handover as described above is generated, it cannot be reflected in neighboring base station information.

Although such handover between the base stations that have not been mutually registered in the neighboring base station information is assured as operation and as a result, handover processing is performed, there is a problem that a processing time is longer and connection delay is larger as compared with normal handover processing in a case where the base stations have been mutually registered in the neighboring base station information. In the above-mentioned Patent literatures 1 and 2, the unpredictable handover as described above has not been taken into consideration.

Consequently, an object of the present invention is to provide a radio communication system, a base station apparatus and a handover control method used therefor, and a storage medium having a program of handover control stored thereon that can solve the above-described problem, and can process semi-normal handover as normal handover even if a same handover pattern is generated after next time, when the semi-normal handover between base stations that have not been mutually registered in neighboring base station information is generated.

Solution to Problem

A radio communication system according to the present invention comprises a terminal station having a radio communication function; and a base station apparatus that transmits and receives a frame using a predetermined frequency to/from the terminal station, the radio communication system being the system that, in the base station apparatus, previously registers neighboring base station information as a part of base station management information, and informs the terminal station of the neighboring base station information, wherein the base station apparatus includes handover processing means for detecting that the terminal station has implemented handover that does not pass through a handover preparation phase from an other base station that has not been registered in a list of the neighboring base station information; and management means for dynamically additionally registering the other base station in the list of the neighboring base station information when implementation of the handover has been detected by the handover processing means.

A base station apparatus according to the present invention comprises the means according to the above-described the radio communication system.

A handover control method according to the present invention is used for a radio communication system comprising a terminal station having a radio communication function, and a base station apparatus that transmits and receives a frame using a predetermined frequency to/from the terminal station, the radio communication system being the system that, in the base station apparatus, previously registers neighboring base station information as a part of base station management information, and informs the terminal station of the neighboring base station information, wherein the base station apparatus executes handover processing to detect that the terminal station has implemented handover that does not pass through a handover preparation phase from an other base station that has not been registered in a list of the neighboring base station information; and management processing to dynamically additionally register the other base station in the list of the neighboring base station information when implementation of the handover has been detected by the handover processing.

A storage medium having a program stored thereon according to the present invention comprises a terminal station having a radio communication function, and the base station apparatus that transmits and receives a frame using a predetermined frequency to/from the terminal station, the program being executed by a central processing unit in a base station apparatus, in a radio communication system, the radio communication system being the system that, in the base station apparatus, previously registers neighboring base station information as a part of base station management information, and informs the terminal station of the neighboring base station information, wherein the program including: handover processing to detect that the terminal station has implemented handover that does not pass through a handover preparation phase from an other base station that has not been registered in a list of the neighboring base station information; and management processing to dynamically additionally register the other base station in the list of the neighboring base station information when implementation of the handover has been detected by the handover processing.

Advantageous Effects of Invention

The present invention is made to have the above-described configuration and operation, and thereby can obtain an effect in which when semi-normal handover between base stations that have not been mutually registered in neighboring base station information is generated, the semi-normal handover can be processed as normal handover even if a same handover pattern is generated after next time.

BRIEF DESCRIPTION OF THE DRAWINGS

FIG. 4 is a flowchart showing the handover operation of a base station according to the exemplary embodiment;

DESCRIPTION OF EMBODIMENTS

Figure 1:
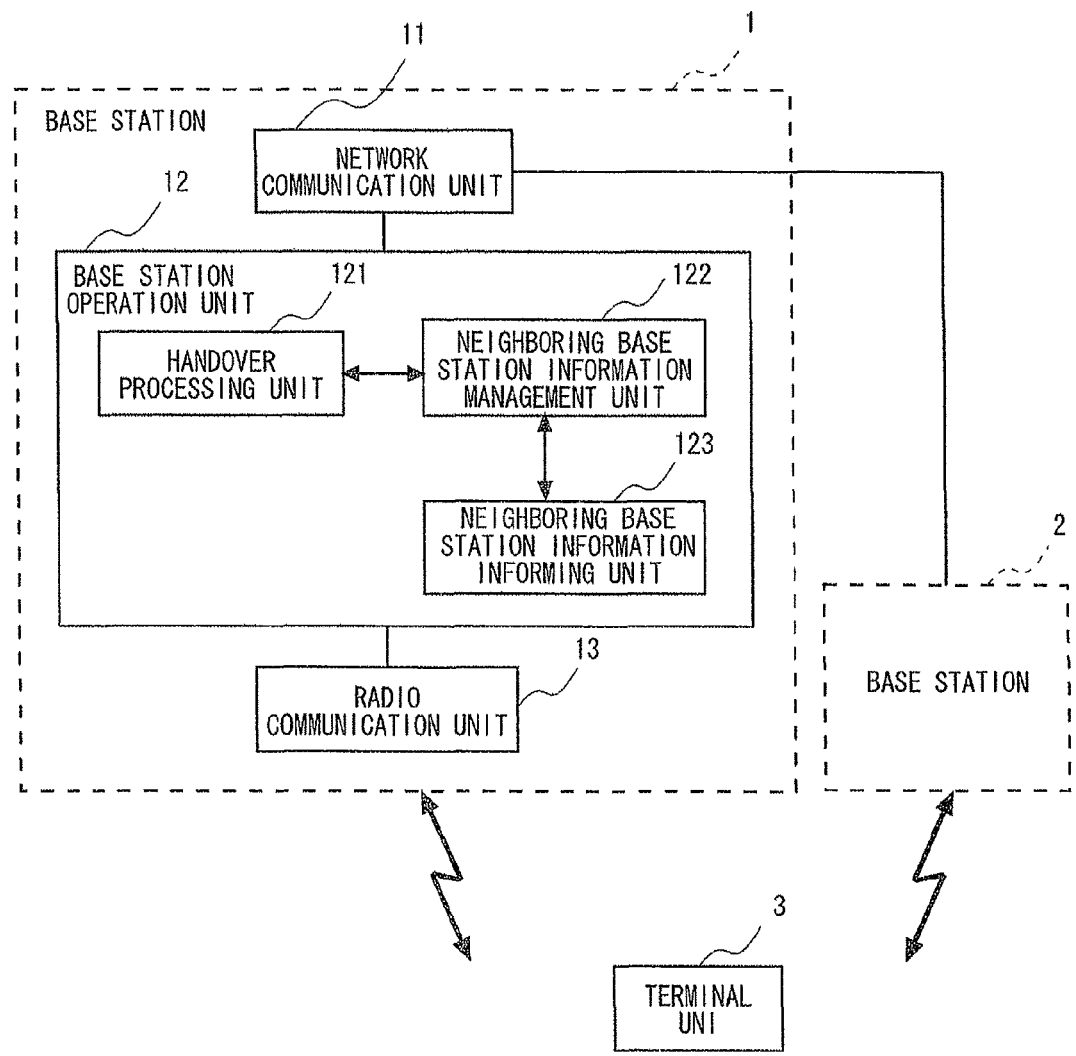
FIG. 1 is a block diagram showing an example of a configuration of a radio communication system according to the exemplary embodiment.

Next, an embodiment of the present invention will be described with reference to drawings. First, a summary of a radio communication system according to the present invention will be described.

The radio communication system according to the present invention includes a radio base station that transmits and receives a frame to/from a terminal having a radio communication function using a predetermined frequency. In this radio base station, neighboring base station information is previously registered as a part of base station management information, and the terminal is informed of the base station management information. The neighboring base station information is the information in which a physically close base station has been selected from surrounding area information (base station map information).

The present invention is characterized in that as for the above-described neighboring base station information, particularly, when the terminal implements handover that does not pass through a handover preparation phase from a base station that has not been registered in the neighboring base station information, the base station is dynamically additionally registered in the neighboring base station information to allow to perform optimization of neighboring base station information registration in an actual field, while operation is continued.

The radio base station includes: a network communication unit; a base station operation unit; and a radio communication unit, and in the base station operation unit, provided are: a handover processing unit; a neighboring base station information management unit; and a neighboring base station information informing unit.

The radio communication unit transmits and receives a control message for handover to/from the terminal station, and the network communication unit transmits and receives the control message for handover to/from an adjacent base station.

The handover control message is input to the base station operation unit, and the handover processing unit collects base station information of a handover destination or a handover source included in the handover control message, and inputs the collected base station information to the neighboring base station information management unit.

The neighboring base station information management unit refers to a current neighboring base station information list, and when the collected base station information is not registered therein, the neighboring base station information management unit dynamically additionally registers the base station information in the neighboring base station information list, and updates the neighboring base station information list. Subsequently, the radio communication unit informs the terminal station of the updated neighboring base station information.

As described above, in the present invention, when the terminal station implements handover, in both cases where the base station serves as a handover source base station, i.e., the base station operates as a Serving base station, and where the base station serves as a handover destination base station i.e., the base station operates as a Target base station, Target base station information and Serving base station information are collected from handover control messages received from the terminal station and an adjacent base station, neighboring base station information is dynamically updated, thus allowing to perform optimization of the neighboring base station information in the actual field, while operation is continued.

Particularly, in the present invention, when the terminal station implements handover that does not pass through the handover preparation phase from the base station that has not been registered in the neighboring base station information, it means that in the handover operation, handover between the base stations that have not been registered in the neighboring base station information has been generated in both the Serving base station and the Target base station, and the present invention has an effect in which whenever a handover pattern that cannot be assumed at the time of initial setting is generated, the neighboring base station information can be updated.

FIG. 1 is a block diagram showing a configuration example of a radio communication system according to the embodiment of the present invention. In FIG. 1, the radio communication system according to the embodiment of the present invention includes base stations 1 and 2, and a terminal station 3. The base station 1 includes: a network communication unit 11; a base station operation unit 12; and a radio communication unit 13, and the base station operation unit 12 includes: a handover processing unit 121; a neighboring base station information management unit 122; and a neighboring base station information informing unit 123.

The base station 1 performs radio communication with the terminal stations 3 through the radio communication unit 13. The base station 2 also has the same configuration as the base station 1. The network communication unit 11 performs inter-base station communication with a plurality of neighboring base stations, for example, the base station 2.

The radio communication unit 13 transmits and receives a control message for handover to/from the terminal station 3. The handover control message is input to the base station operation unit 12, and the handover processing unit 121 collects base station information of a handover destination (hereinafter referred to as Target base station information) or base station information of a handover source (hereinafter referred to as Serving base station information) that are included in the handover control message, and inputs the collected base station information to the neighboring base station information management unit 122.

The neighboring base station information management unit 122 refers to a current neighboring base station information list, and when the collected base station information is not registered therein, the neighboring base station information management unit 122 dynamically additionally registers the base station information in the neighboring base station information list, and updates the neighboring base station information list. Subsequently, the radio communication unit 13 informs the terminal station 3 of the updated neighboring base station information.

As described above, since the Target base station information and the Serving base station information are collected from the handover control message received from the terminal station 3, and the neighboring base station information is dynamically updated, the radio communication system according to the present invention can be configured such that when the handover between the base stations that have not been mutually registered in the neighboring base station information, which is a problem of the above-mentioned background art, is generated, even if a same handover pattern is generated after next time, it is processed as normal handover.

Note that the base station operation unit 12 is well-known to those skilled in the art, and that description of detailed configurations of units that are not directly related to the present invention will be omitted.

Figure 2:
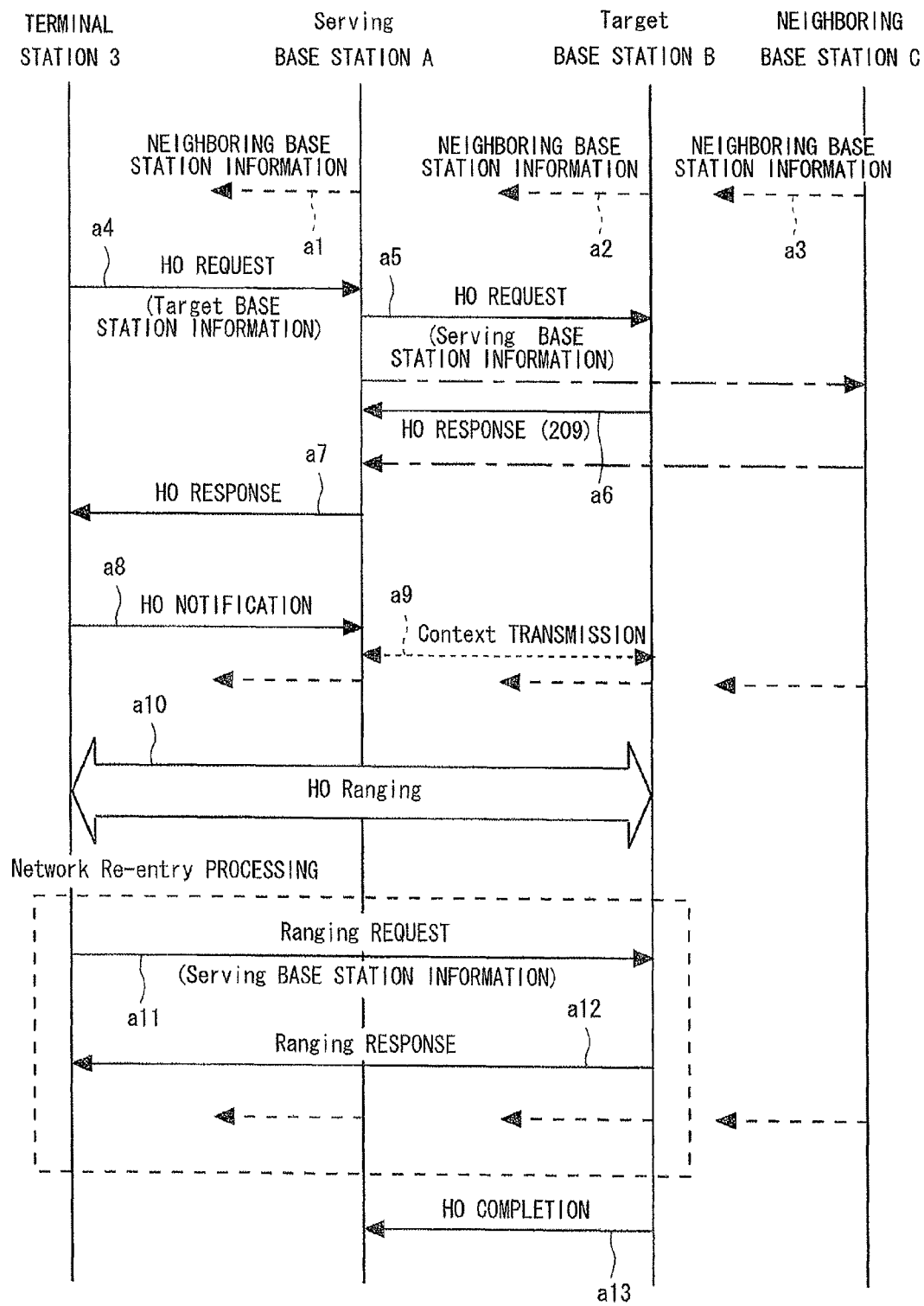
FIG. 2 is sequence chart showing an example of a handover operation of the radio communication system according to the exemplary embodiment.
Figure 3:
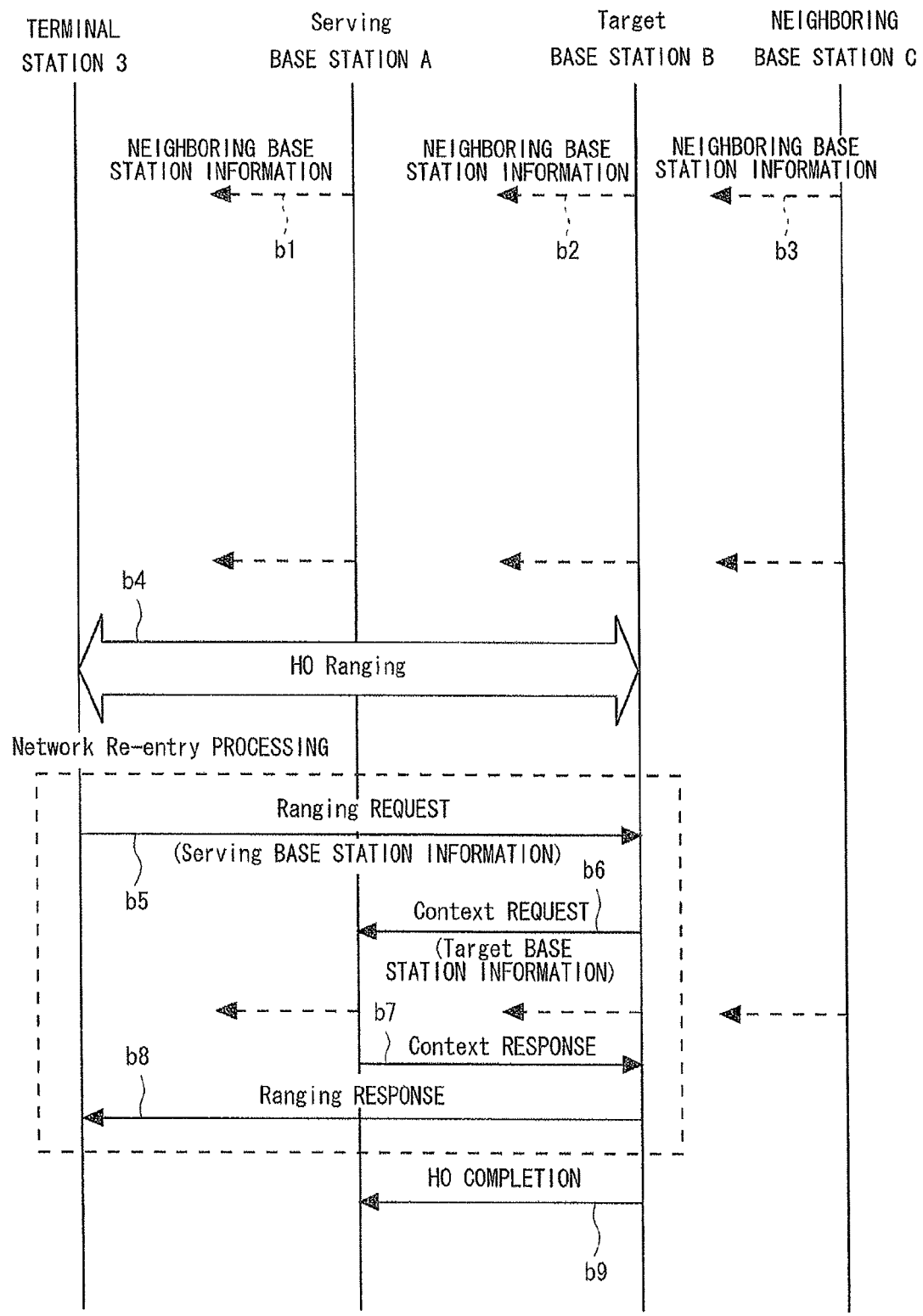
FIG. 3 is sequence chart showing an another example of the handover operation of the radio communication system according to the exemplary embodiment.

FIG. 2 is a sequence chart showing one example of handover operation in the radio communication system according to the embodiment of the present invention, and FIG. 3 is a sequence chart showing an other example of handover operation in the radio communication system according to the embodiment of the present invention. With reference to these FIGS. 1 to 3, there will be described handover operation in the radio communication system according to the embodiment of the present invention.

At the beginning, in FIG. 2, it is assumed that the base station 1 shown in FIG. 1 operates as a Serving base station A, and that the base station 2 operates as a Target base station B.

When the Serving base station A receives an HO (Hand Over) request from the terminal station 3 (a4 of FIG. 2), the handover processing unit 121 collects Target base station information included in the HO request, inputs the collected Target base station information to the neighboring base station information management unit 122, and at the same time, transmits a HO request to the Target base station B through the network communication unit 11 (a5 of FIG. 2).

The neighboring base station information management unit 122 refers to the holding neighboring base station information, confirms whether or not the input Target base station information has been registered, and when the input Target base station information has not been registered, the neighboring base station information management unit 122 additionally registers information of the Target base station B in the neighboring base station information.

The Target base station B that has received the HO request collects Serving base station information included in the HO request in the handover processing unit 121, inputs the collected Serving base station information to the neighboring base station information management unit 122, and at the same time, sends a handover response back to the Serving base station A (a6 of FIG. 2).

The neighboring base station information management unit 122 in the Target base station B refers to the holding neighboring base station information, confirms whether or not the input Serving base station information has been registered, and when the input Serving base station information has not been registered, the neighboring base station information management unit 122 additionally registers information of the Serving base station A in the neighboring base station information.

The Serving base station A that has received the handover response sends the handover response back to the terminal station 3 (a7 of FIG. 2).

The terminal station 3 that has received the handover response transmits an HO notification to the Serving base station A (a8 of FIG. 2), and the Serving base station A that has received the HO notification performs transmission of Context information of the terminal station 3 to the Target base station B (a9 of FIG. 2).

The terminal station 3 that has transmitted the HO notification transmits a ranging request to the Target base station B (a11 of FIG. 2). The Target base station B that has received the ranging request collects the Serving base station information included in the ranging request in the handover processing unit 121, inputs the collected Serving base station information to the neighboring base station information management unit 122, and at the same time, sends a ranging response back to the terminal station 3 (a12 of FIG. 2).

In addition, the Target base station B transmits handover completion to the Serving base station A (a13 of FIG. 2). The neighboring base station information management unit 122 in the Target base station B refers to the holding neighboring base station information, confirms whether or not the input Serving base station information has been registered, and when the input Serving base station information has not been registered, the neighboring base station information management unit 122 additionally registers information of the Serving base station A in the neighboring base station information.

FIG. 3 is a handover sequence that may be generated, for example, in the Serving base station A and the Target base station B when they have not been mutually registered in the neighboring base station information, and a difference between FIG. 3 and FIG. 2 that is a normal handover sequence lies in the fact that the sequence (handover preparation phase) from the HO request to the handover response in FIG. 2 is omitted from FIG. 3.

The terminal station 3 detects a radio wave of the Target base station B, and transmits a ranging request to the Target base station B (b5 of FIG. 3). The Target base station B that has received the ranging request collects Serving base station information included in the ranging request in the handover processing unit 121, inputs the collected Serving base station information to the neighboring base station information management unit 122, and at the same time, transmits a Context request to the Serving base station A in order to acquire context information of the terminal station 3 (b6 of FIG. 3).

The neighboring base station information management unit 122 in the Target base station B refers to the holding neighboring base station information, confirms whether or not the input Serving base station information has been registered therein, and when the input Serving base station information has not been registered, the neighboring base station information management unit 122 additionally registers information of the Serving base station A in the neighboring base station information.

The Serving base station A that has received the Context request, in the handover processing unit 121, collects the Target base station information included in the Context request, inputs the collected Target base station information to the neighboring base station information management unit 122, and at the same time, sends a Context response back to the Target base station B (b7 of FIG. 3).

The neighboring base station information management unit 122 in the Serving base station A refers to the holding neighboring base station information, confirms whether or not the input Target base station information has been registered, and when the input Target base station information has not been registered, the neighboring base station information management unit 122 additionally registers information of the Target base station B in the neighboring base station information.

The Target base station B that has received the Context response sends a ranging response back to the terminal station 3 (b8 of FIG. 3), and at the same time, transmits handover completion to the Serving base station A (b9 of FIG. 3).

FIG. 4 is a flow chart showing handover operation in a base station according to the embodiment of the present invention. With reference to these FIGS. 1 and 4, there will be described whether or not a message including information of the Serving base station, the Target base station, and the neighboring base station has been received, and registration operation to the neighboring base station information implemented with reference to the message. Note that processing operation shown in FIG. 4 is achieved by CPUs (central processing units) (not shown) in the base stations 1 and 2 executing a program in a memory that is not shown.

When receiving an HO request in determination of whether or not the HO request from the terminal station 3 has been received (step S1 of FIG. 4), the base station 1 transmits an HO request to the Target base station and the neighboring base station registered in the neighboring base station information (step S2 of FIG. 4).

After that, when the Target base station and the neighboring base station have not been registered in the determination of whether or not they have been registered in the neighboring base station information (step S3 of FIG. 4), the base station 1 registers the Target base station and the neighboring base station in the neighboring base station information (step S4 of FIG. 4), and ends processing. In addition, when the Target base station and the neighboring base station have been already registered in the neighboring base station information, the base station 1 ends processing.

When not receiving the HO request from the terminal station 3 in the determination processing of the above-described step S1, when receiving the HO request in determination of whether or not the HO request from the Serving base station has been received (step S5 of FIG. 4), and when the Serving base station has not been registered in determination of whether or not it has been registered in the neighboring base station information (step S6 of FIG. 4), the base station 1 registers the Serving base station in the neighboring base station information (step S7 of FIG. 4), and ends processing. In addition, when the Serving base station has been already registered in the neighboring base station information, the base station 1 ends processing.

When the base station 1 does not receive the HO request from the Serving base station in the determination processing of the above-described step S5, and when it receives the ranging request in determination of whether or not the ranging request has been received from the terminal station 3 (step S8 of FIG. 4), the process proceeds to determination of whether or not the Serving base station has been registered in the neighboring base station information (step S6 of FIG. 4), When the base station 1 does not receive the ranging request from the terminal station 3 in the determination processing of the above-described step S8, and when it receives a context request in determination of whether or not a terminal context request has been received from the Target base station (step S9 of FIG. 4), the process proceeds to determination of whether or not the Target base station and the neighboring base station have been registered in the neighboring base station information (step S3 of FIG. 4). When not receiving the context request, the base station 1 ends processing.

As described above, in the embodiment, since the information of the Serving base station, the Target base station, and the neighboring base station is collected from the handover control message, and the neighboring base station information is updated based on the information, even if semi-normal handover between base stations that have not been mutually registered in the neighboring base station information is generated, the semi-normal handover can be processed as normal handover in a same handover pattern being generated after next time.

In addition, in the embodiment, neighboring base station information can be updated in both of the Serving base station and the Target base station, and the neighboring base station with respect to one handover operation.

Although the present invention has been described as a configuration of a hardware in the above-mentioned embodiment, the present invention is not limited to this. In the present invention, arbitrary processing can be achieved by making a CPU (Central Processing Unit) execute a computer program. In this case, the computer program can be provided by being recorded on a recording medium, or it can also be provided by being transmitted through the Internet or an other communication medium. In addition, a storage medium, for example, includes: a flexible disk; a hard disk; a magnetic disk; a magnetic optical disk; a CD-ROM; a DVD; a ROM cartridge; a RAM memory cartridge with battery back-up; a flash memory cartridge; and a nonvolatile RAM cartridge. In addition, the communication medium includes wired communication media, such as a telephone line, radio communication media, such as a microwave line, and the like.

Hereinbefore, although the invention in this application has been described with reference to the embodiment, the invention in this application is not limited by the above. To a configuration and details of the invention of this application, can be made various changes that those skilled in the art can understand within the scope of the invention.

This application claims priority based on Japanese Patent Application No. 2011-105764 filed on May 11, 2011, and the entire disclosure thereof is incorporated herein.

REFERENCE SIGNS LIST 1, 2 Base station
3 Terminal station
11 Network transmission unit
12 Base station operation unit
13 Radio communication unit
121 Handover processing unit
122 Neighboring base station information management unit
123 Neighboring base station information informing unit
A Serving base station
B Target base station
C Neighboring base station

The invention claimed is:
1. A radio communication system, comprising:
a terminal station having a radio communication function; and
a base station apparatus that transmits and receives a frame using a predetermined frequency to/from the terminal station, the radio communication system including a system that, in the base station apparatus, previously registers neighboring base station information as a part of base station management information, and informs the terminal station of the neighboring base station information, wherein the base station apparatus that serves as a handover destination base station when the terminal station implements handover includes:

a handover processing unit that detects that the terminal station has implemented handover by detecting that the terminal station has transmitted a ranging request without passing through a handover preparation phase when the terminal station has implemented handover from an other base station that serves as a handover source base station and that has not been registered in a list of the neighboring base station information; and a management unit that dynamically additionally registers the other base station included in the ranging request in the list of the neighboring base station information when implementation of the handover has been detected by the handover processing unit.

2. The radio communication system according to claim 1, wherein the handover processing unit collects handover destination base station information or handover source base station information that are included in a control message for the handover, and inputs the base station information in the management unit.

3. The radio communication system according to claim 2, wherein, when the management unit refers to a list of a current neighboring base station information, and the base station information collected by the handover processing unit has not been registered in the list of the neighboring base station information, the management unit dynamically additionally registers the base station information in the list of the neighboring base station information, and updates the list of the neighboring base station information.

4. A base station apparatus comprising the handover processing unit and the management unit according to the above-described claim 1.

5. The radio communication system according to claim 1, wherein the terminal station transmits the ranging request to the handover destination base station without passing through the handover preparation phase as a trigger.

6. The radio communication system according to claim 5, wherein the handover destination base station registers the other base station included in the ranging request in the list of the neighboring base station information.

7. The radio communication system according to claim 1, wherein the handover destination base station registers the other base station included in the ranging request in the list of the neighboring base station information.

8. The radio communication system according to claim 1, wherein the handover processing unit collects handover source base station information that are included in a control message for the handover.

9. The radio communication system according to claim 1, wherein the handover preparation phase includes sending a handover request from the terminal station to the handover source station.

10. The radio communication system according to claim 9, wherein the handover preparation phase further includes confirming whether the handover destination base station is registered in the neighboring base station information.

11. A handover control method used for a radio communication system comprising a terminal station having a radio communication function, and a base station apparatus that transmits and receives a frame using a predetermined frequency to/from the terminal station, the radio communication system including a system that, in the base station apparatus, previously registers neighboring base station information as a part of base station management information, and informs the terminal station of the neighboring base station information, wherein the base station apparatus that serves as a handover destination base station when the terminal station implements handover executes:

handover processing to detect that the terminal station has implemented handover that by detecting that the terminal station has transmitted a ranging request without passing through a handover preparation phase when the terminal station has implemented handover from an other base station that serves as a handover source base station and that has not been registered in a list of the neighboring base station information; and management processing to dynamically additionally register the other base station included in the ranging request in the list of the neighboring base station information when implementation of the handover has been detected by the handover processing.

12. The handover control method according to claim 11, wherein, in the handover processing, handover destination base station information or handover source base station information that are included in a control message for the handover is collected, and the base station information is input in the management processing.

13. The handover control method according to claim 12, wherein, in the management processing, when a list of a current neighboring base station information is referenced, and the base station information collected by the handover processing has not been registered in the list of the neighboring base station information, the base station information is dynamically additionally registered in the list of the neighboring base station information, and the list of the neighboring base station information is updated.

14. The handover control method according to claim 11, wherein the terminal station transmits the ranging request to the handover destination base station without passing through the handover preparation phase as a trigger.

15. The handover control method according to claim 14, wherein the handover destination base station registers the other base station included in the ranging request in the list of the neighboring base station information.

16. The handover control method according to claim 11, wherein the handover destination base station registers the other base station included in the ranging request in the list of the neighboring base station information.

17. The handover control method according to claim 11, wherein the handover processing unit collects handover source base station information that are included in a control message for the handover.

18. The handover control method according to claim 11, wherein the handover preparation phase includes sending a handover request from the terminal station to the handover source station.

19. The handover control method according to claim 18, wherein the handover preparation phase further includes confirming whether the handover destination base station is registered in the neighboring base station information.

* * * * *